United States Patent
Sato et al.

(10) Patent No.: US 8,578,216 B2
(45) Date of Patent: Nov. 5, 2013

(54) EXECUTION HISTORY TRACING METHOD

(75) Inventors: Shuhei Sato, Yokohama (JP); Takashi Sato, Yokohama (JP)

(73) Assignee: Spansion LLC, Sunnyvale, CA (US)

( * ) Notice: Subject to any disclaimer, the term of this patent is extended or adjusted under 35 U.S.C. 154(b) by 567 days.

(21) Appl. No.: 12/721,667

(22) Filed: Mar. 11, 2010

(65) Prior Publication Data

US 2010/0235686 A1   Sep. 16, 2010

(30) Foreign Application Priority Data

Mar. 16, 2009   (JP) .................................. 2009-63164

(51) Int. Cl.
*G06F 11/26* (2006.01)

(52) U.S. Cl.
USPC ............................................. 714/45; 714/37

(58) Field of Classification Search
USPC ......................................................... 714/45
See application file for complete search history.

(56) References Cited

U.S. PATENT DOCUMENTS

| | | | | |
|---|---|---|---|---|
| 6,314,530 | B1 * | 11/2001 | Mann ......................... | 714/38.11 |
| 6,321,290 | B1 | 11/2001 | Yamashita | |
| 2002/0010882 | A1 * | 1/2002 | Yamashita ..................... | 714/45 |
| 2003/0051122 | A1 | 3/2003 | Sato | |
| 2003/0192034 | A1 * | 10/2003 | Hayase .......................... | 717/128 |
| 2003/0212937 | A1 * | 11/2003 | Todd et al. .................... | 714/724 |
| 2005/0289399 | A1 * | 12/2005 | Kimura ........................... | 714/45 |
| 2006/0242470 | A1 * | 10/2006 | McCullough et al. .......... | 714/45 |
| 2006/0248177 | A1 * | 11/2006 | Dostert et al. ................. | 709/223 |
| 2006/0282707 | A1 * | 12/2006 | Rosenbluth et al. ............ | 714/38 |
| 2006/0294343 | A1 * | 12/2006 | Rejmaniak ..................... | 712/227 |
| 2007/0101198 | A1 * | 5/2007 | Ueno ............................... | 714/38 |
| 2007/0214341 | A1 * | 9/2007 | Das .................................. | 712/38 |
| 2007/0234306 | A1 * | 10/2007 | Klinger et al. ................ | 717/128 |
| 2008/0059843 | A1 | 3/2008 | Sato et al. | |

FOREIGN PATENT DOCUMENTS

| | | |
|---|---|---|
| JP | 8-44587 | 2/1996 |
| JP | 11-312098 | 11/1999 |
| JP | 2000-222228 | 8/2000 |
| JP | 2000-222243 | 8/2000 |

(Continued)

OTHER PUBLICATIONS

Kubota Minoru, "Message Trace in Distributed Object-oriented Systems", Journal of Information Processing Society of Japan, Information Processing Society of Japan, Jan. 15, 1998, vol. 39 No. 1, p. 91-101.

(Continued)

*Primary Examiner* — Chae Ko
(74) *Attorney, Agent, or Firm* — Sterne, Kessler, Goldstein & Fox P.L.L.C.

(57) ABSTRACT

An execution history tracing method includes tracing an execution history of a CPU upon executing, in a semiconductor device including the CPU, a program by using the CPU, for one or a tracing target, from outside the semiconductor device via software. The execution history tracing method includes recording, in a buffer, target information as trace information about an execution of the one or the tracing target, for each instruction cycle in which the target information is produced as the execution history; and performing data sorting by using the software to group the trace information about the execution of the one or the tracing target, the trace information being recorded for the each instruction execution cycle, for each of the one or the tracing target.

5 Claims, 11 Drawing Sheets

(56) References Cited

FOREIGN PATENT DOCUMENTS

| JP | 2002-318734 | 10/2002 |
|---|---|---|
| JP | 2003-85000 | 3/2003 |
| JP | 2008-59515 | 3/2008 |
| JP | 2008-65441 | 3/2008 |

OTHER PUBLICATIONS

Japanese Notification of Reasons for Refusal dated Feb. 19, 2013, issued in corresponding Japanese Patent Application No. 2009-063164.

Japanese Office Action issued May 21, 2013 in corresponding Japanese Application No. 2009-063164.

* cited by examiner

FIG.2

BRANCH TRACE FRAME

| bit67 | Bit66-64 | Bit63-32 | Bit31-0 |
|---|---|---|---|
| 0b0 (BRANCH TRACE) | BRANCH FACTOR<br>0b000 : INTERRUPT<br>0b001 : EXCEPTION<br>0b010 : BRANCH INSTRUCTION 1<br>...<br>0b111 : BRANCH INSTRUCTION 6 | BRANCH DESTINATION PC | BRANCH SOURCE PC |

DATA TRACE FRAME

| bit67 | bit66 | bit65,64 | Bit63-32 | Bit31-0 |
|---|---|---|---|---|
| 0b1 (DATA TRACE) | READ/WRITE<br>0b0 : READ<br>0b1 : WRITE | ACCESS SIZE<br>0b00 : 8bit<br>0b01 : 16bit<br>0b10 : 32bit<br>0b11 : RESERVE | ACCESS ADDRESS | ACCESS DATA |

FIG.5

| bit139 | bit138 | Bit137-135 | Bit134-103 | bit102 | bit101,100 | Bit99-68 |
|---|---|---|---|---|---|---|
| BRANCH SOURCE FLAG | BRANCH DESTINATION FLAG | BRANCH FACTOR<br>0b000 : INTERRUPT<br>0b001 : EXCEPTION<br>0b010 : BRANCH INSTRUCTION 1<br>...<br>0b111 : BRANCH INSTRUCTION 6 | EXECUTING PC | READ DATA VALIDITY | READ DATA ID | READ DATA |

| bit67 | bit66 | bit65,64 | Bit63-32 | Bit31-0 |
|---|---|---|---|---|
| DATA ACCESS VALIDITY | READ/WRITE<br>0b0 : READ<br>0b1 : WRITE | ACCESS SIZE | ACCESS ADDRESS | WRITE DATA<br>(WHEN READ ACCESS, BITS 1, 0 REPRESENT READ ACCESS ID) |

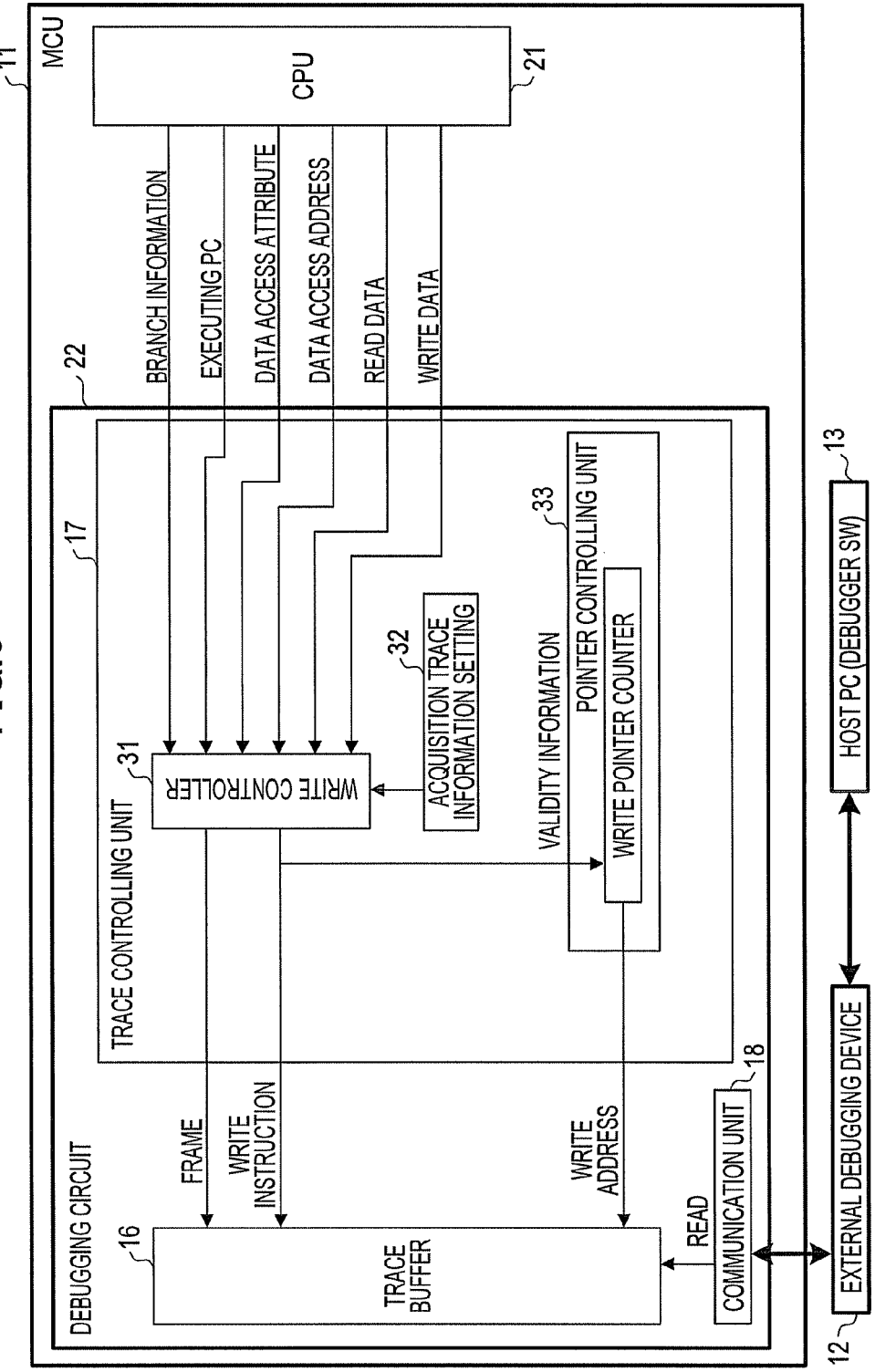

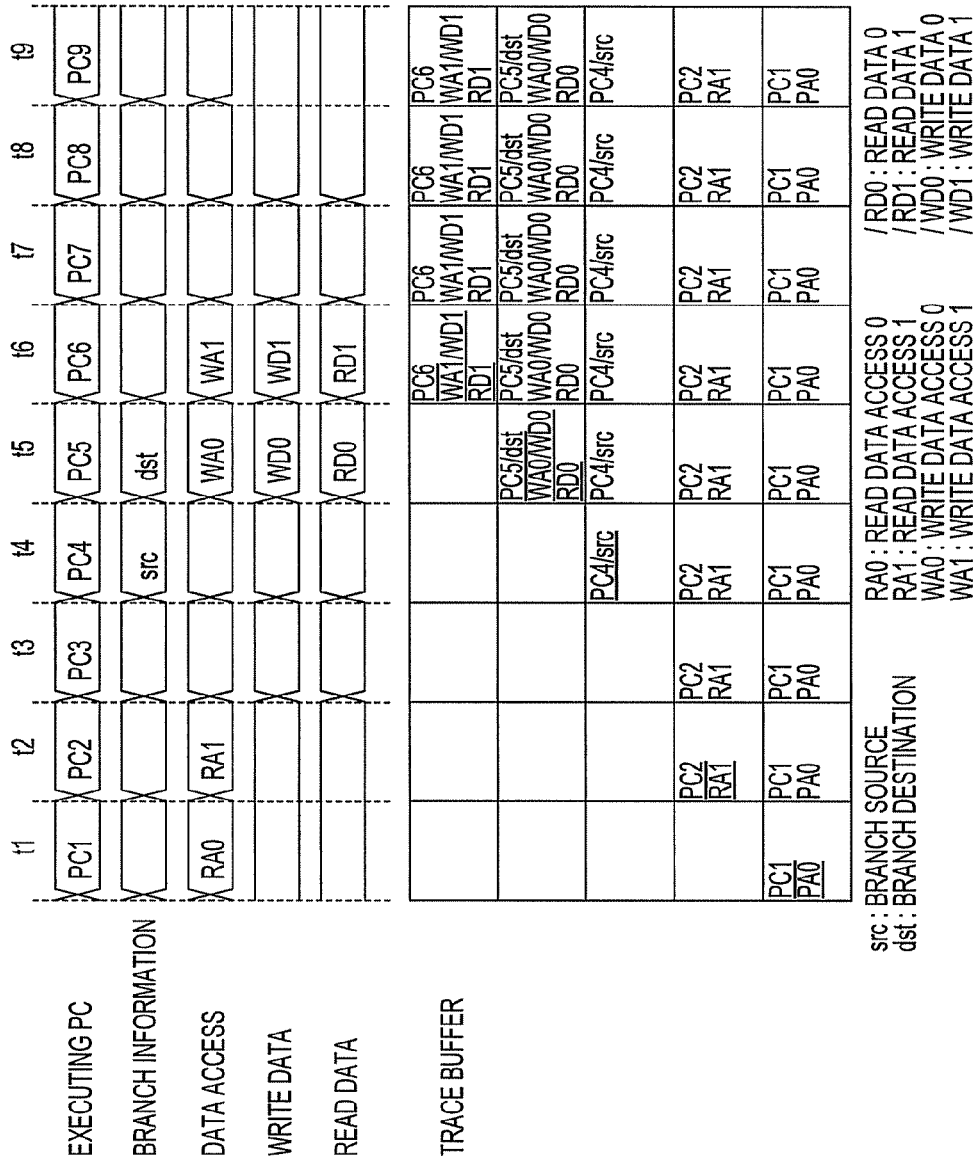

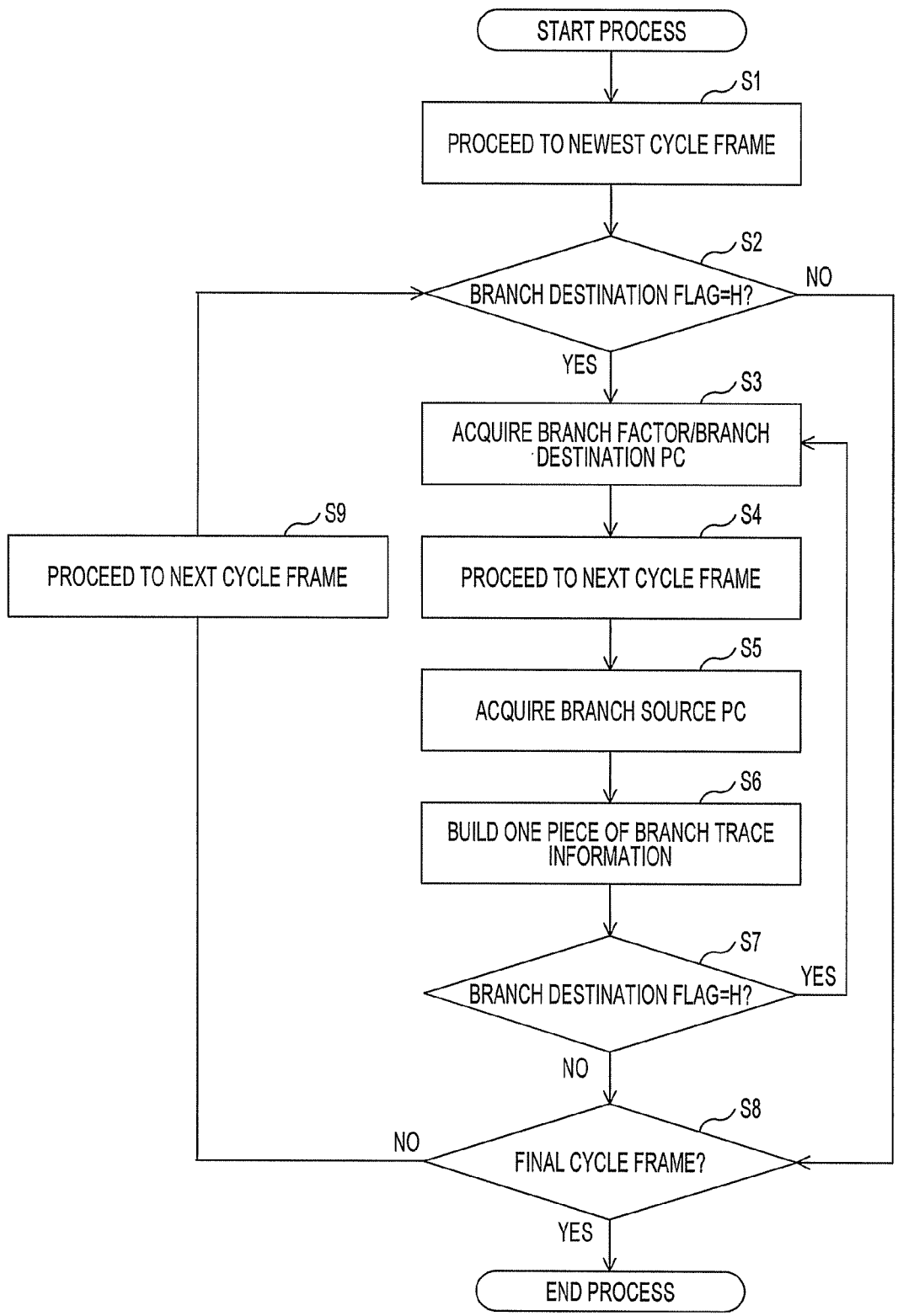

EXECUTION HISTORY TRACING METHOD

CROSS-REFERENCE TO RELATED APPLICATIONS

This application is based upon and claims the benefit of priority of the prior Japanese Patent Application No. 2009-63164, filed on Mar. 16, 2009 the entire contents of which are incorporated herein by reference.

FIELD

The disclosure of the present application generally relates to a debugging approach for examining the validity of a program, and more particularly to a tracing method of tracing the execution history of a program executed by a central processing unit (CPU).

BACKGROUND

In semiconductor devices on which CPUs, such as micro controller units (MCUs), are mounted, debugging systems are used at the time of developing programs to be executed by the CPUs. Such a debugging system displays information on the operation of a CPU that executes a program being developed, and provides functions for carrying out specific operations of the program being developed so as to support debugging operations.

Various kinds of execution history information (trace information), which represents the operation history of a CPU configured to execute programs, include branch trace information, which represents the histories of branch executions, and data trace information, which represents the history of executing data accesses. In execution of a program by the CPU, a plurality of events that produce these kinds of trace information may occur simultaneously. For example, it is conceivable that one instruction in an instruction sequence included in a program is both an instruction for a branch destination and an instruction for a branch source that further specifies a branch from the branch destination. It is also conceivable, for example, that read data (part of data trace information) for a read access instruction that has been executed is supplied from a memory to the CPU at the same time as executions of a branch instruction and a data access instruction. In such cases where a plurality of events occurs at the same time, it is preferable that, during recording of trace information, all information to be recorded be recorded without any loss. It is also preferable that trace information handled in a debugging system be data in a format that is easy for a user to understand even when a plurality of events are complicated or occur at the same time during execution of a program. That is, even with complication or simultaneous occurrence of a plurality of events during execution of a program, it is preferable that trace information be produced in a data format arranged for each branch execution and for each data access execution. Thus, in a debugging system, trace information is allowed to be presented to a user in a form easy to understand.

Accordingly, a tracing method is desired that records all information to be recorded without any loss, and that produces trace information in a data format arranged for each branch execution and for each data access execution.

SUMMARY

According to one aspect of the invention, an execution history tracing method includes tracing an execution history of a CPU upon executing, in a semiconductor device including the CPU, a program by using the CPU, for one or a plurality of tracing targets, from outside the semiconductor device via software. The execution history tracing method further includes recording, in a buffer, target information as trace information about an execution of the one or the plurality of tracing targets, for each instruction execution cycle in which the target information is produced as the execution history; and performing data sorting by using the software to group the trace information about the execution of the one or the plurality of tracing targets, the trace information being recorded for the each instruction execution cycle, for each of the one or the plurality of tracing targets.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of a trace frame format in a tracing method.

FIG. 5 illustrates an example of a cycle frame format in the tracing method.

FIG. 6 illustrates an example of a configuration of a debugging circuit.

FIG. 7 illustrates an example of the operation of the debugging circuit at the time of recording trace information in the cycle frame format illustrated in FIG. 5.

FIG. 8 is a flowchart illustrating an example of a process of building branch trace information.

DETAILED DESCRIPTION OF THE EMBODIMENTS

Embodiments of the invention will be described in detail below with reference to the accompanying drawings.

Figure 1:
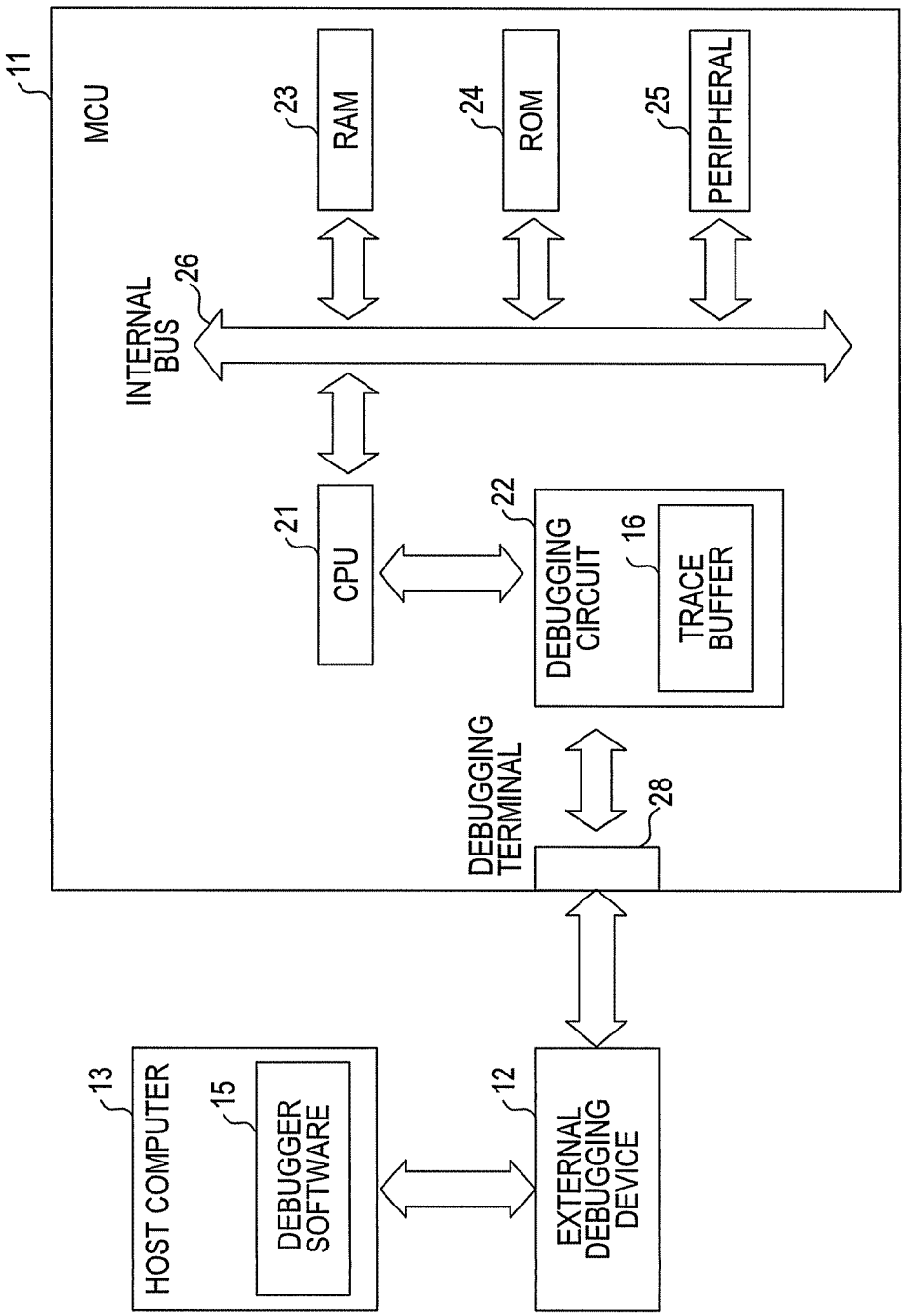
FIG. 1 illustrates an example of a configuration of a debugging system.

FIG. 1 illustrates an example of a configuration of a debugging system. A debugging system 10 includes a semiconductor device 11 such as a micro processing unit (MPU), an external debugging device 12, and a host computer 13. The semiconductor device 11 is a device in which a program is to be debugged, and includes a CPU 21, a debugging circuit 22, a random access memory (RAM) 23, a read-only memory (ROM) 24, a peripheral circuit 25, and an internal bus 26. The CPU 21 executes a program stored in the RAM 23 and/or the ROM 24. The CPU 21 accesses the RAM 23 and uses the RAM 23 as a work area appropriately during execution of a program. The CPU 21 is connected to the debugging circuit 22 so as to supply various kinds of execution history information to the debugging circuit 22. The debugging circuit 22 causes the CPU 21 to execute a debugging program, thereby implementing a desired debugging function.

The external debugging device 12 is coupled to the debugging circuit 22 via a debugging terminal 28, and functions as an interface between the debugging circuit 22 and the host computer 13. On the host computer 13, debugger software 15 is executed. A user operates the debugger software'15 on the host computer 13 to perform debugging operations of a program executed by the CPU 21 of the semiconductor device 11. The debugging circuit 22 includes a trace buffer 16. The trace buffer 16 stores various kinds of information about execution histories of the CPU 21.

Trace information in program debugging is acquired using the debugging system 10, for example, in the following flow. First, in order to temporarily suspend execution of a program of the CPU 21, the CPU 21 performs break processing. The state where execution of a program is suspended is referred to as a "debug state". In the debug state, trace setting of the debugging circuit 22 is performed by the debugger software 15. The trace setting involves, for example, setting what information is to be acquired as trace information, and setting the start point and the end point of tracing in a program. After completion of trace setting, a break return instruction is provided by the debugger software 15 for the CPU 21 to resume the execution of the program. In the execution process of the program of the CPU 21, the debugging circuit 22 stores various kinds of execution histories of the CPU 21 in the trace buffer 16 in accordance with the trace setting. When acquisition of trace information has been completed and an event previously set as a break factor occurs, the CPU 21 again performs break processing to suspend execution of the program, and shifts to the debug state. By reading from the trace buffer 16 the trace information obtained by the foregoing processing and analyzing the trace information using the debugger software 15, a user may learn about the execution histories of the program.

As described above, it is desirable to produce trace information in a data format arranged for each branch execution and for each data access execution. For this purpose, it is conceivable that a debugging circuit is configured so that trace information is recorded in a data format arranged in such a manner in a trace buffer. Hereinafter, the data format arranged in this manner is referred to as a "trace frame format".

FIG. 2 illustrates an example of a trace frame format in a tracing method. For example, in the case of a CPU having a 32-bit configuration, the data width of a trace buffer is 68 bits. At bit 67, a binary number "0b0" indicates the fact that a trace frame in question is a branch trace frame, and a binary number "0b1" indicates that the trace frame in question is a data trace frame. In the case of the branch trace frame, data representing branch factors is stored at bits 66 to 64, branch destination program counter values (PC values of the CPU) are stored at bits 63 to 32, and branch source program counter values are stored at bits 31 to 0. In the case of the data trace frame, a bit value representing a read access or a write access is stored at bit 66, access sizes are stored at bits 65 to 64, access addresses are stored at bits 63 to 32, and access data is stored at bits 31 to 0.

Figure 3:
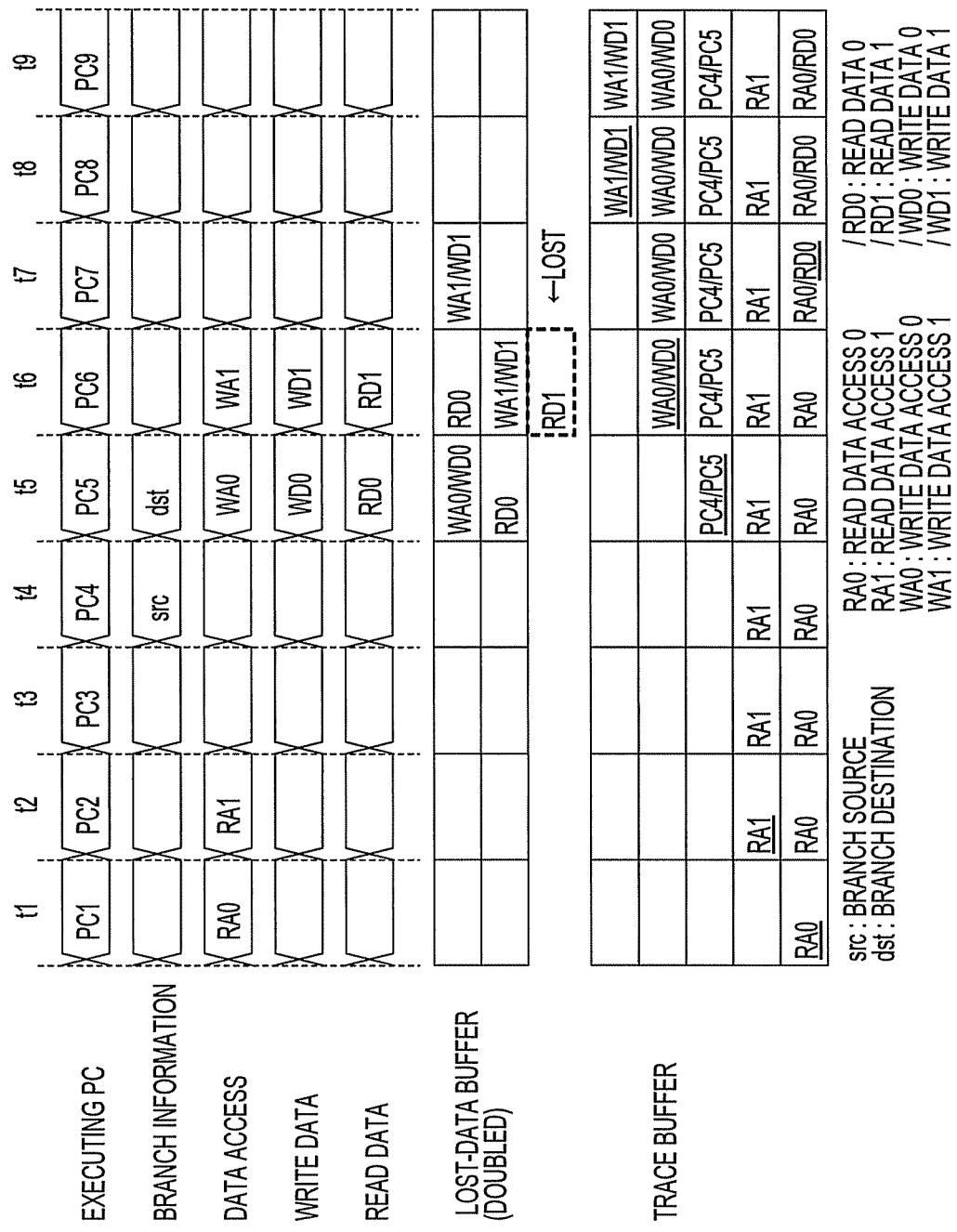
FIG. 3 illustrates an example of the operation of a debugging circuit at the time of recording trace information in the format illustrated in FIG. 2.

FIG. 3 illustrates an example of the operation of the debugging circuit when trace information on execution histories of the CPU is recorded in the trace frame format illustrated in FIG. 2. In FIG. 3, reference characters t1 to t9 denote nine successive execution cycles of instruction of the CPU. The row "execution PC" illustrates a program counter value (a PC value of the CPU) in each cycle, and the row "branch information" illustrates a branch source or a branch destination. The row "data access" illustrates a read access or a write access. The row "write data" illustrates write data corresponding to the write access, and the row "read data" illustrates read data corresponding to the read access. A buffer for lost data (hereinafter referred to as a "lost-data buffer") is configured in a first-in first-out (FIFO) manner and is used for temporarily storing information if execution information of the CPU is not able to be stored in a trace buffer. A table "trace buffer" illustrates trace information listed from the bottom toward the top in the order in which the information is produced. Here, underlined information in the "trace buffer" table represents information that is newly stored in the cycle in question. In the operation example illustrated in FIG. 3, load instructions are executed in the cycles t1 and t2, a branch instruction is executed in the cycle t4, and store instructions are executed in the cycles t5 and t6.

A read access RA0 and a read access RA1 occur in the cycles t1 and t2, respectively, and trace information representing the read accesses is stored in the trace buffer. That is, a data trace frame illustrated in FIG. 2 with the value "0b0" set at bit 66 is stored in the trace buffer. Values corresponding to the read accesses are stored as the access sizes and access addresses of the data trace frame. However, regarding access data, read data is not acquired at this point and therefore no value is set.

For a branch instruction executed in the cycle t4, information on a branch destination is obtained in the cycle t5. Accordingly, in the cycle t5, the branch trace frame illustrated in FIG. 2, together with values representing branch factors, the branch destination program counter value (PC5) and the branch source program counter value (PC4), are stored in the trace buffer. In the example illustrated in FIG. 3, in the cycle t5, a write access WA0 and write data WD0 are further produced by an instruction execution of the program counter value PC5, and simultaneously read data RD0 corresponding to the read access RA0 of a program counter value PC1 is received. Data of just one trace frame is allowed to be stored in the trace buffer at one time. In the cycle t5, since the branch trace frame is stored in the trace buffer, the write access WA0 and the write data WD0, and the read data RD0 are temporarily stored in the lost-data buffer.

In the cycle t6, information of the write access WA0 and the write data WD0 that has been temporarily stored in the lost-data buffer in the cycle t5 is stored as a data trace frame into the trace buffer. In the cycle t6, a write access WA1 and write data WD1 are further produced by execution of an instruction of a program counter value PC6, and simultaneously read data RD1 corresponding to the read access RA1 of a program counter value PC2 is received. The write access WA1 and the write data WD1, and the read data RD1 are temporarily stored in the lost-data buffer in the cycle t6. However, the lost-data buffer in this example is a two-stage FIFO configuration, and therefore the read data RD1 overflows from the lost-data buffer. As a result, information on the read data RD1 is lost.

In the cycle t7, the read data RD0 temporarily stored in the lost-data buffer in the cycle t5 is stored in a trace frame, in which the read access RA0 is stored, in the trace buffer. In the cycle t8, information of the write access WA1 and the write data WD1 temporarily stored in the lost-data buffer in the cycle t6 is stored in the trace buffer. Likewise, in the subsequent processes, information on the execution of the CPU is stored in the trace buffer in the order in which the information is produced, and information that is not able to be stored in the trace buffer is temporarily stored in the lost-data buffer.

Trace information recorded in the trace buffer as mentioned above is stored as a branch trace frame representing branch executions and as a data trace frame representing executions of data accesses. That is, by using a trace frame format, the trace information is recorded and stored in a data format arranged for each branch execution and for each data access execution. Accordingly, it is possible to extract data from the trace frame format and present the data to a user in a manner easy to understand, without conversion processing such as data sorting.

Figure 4:
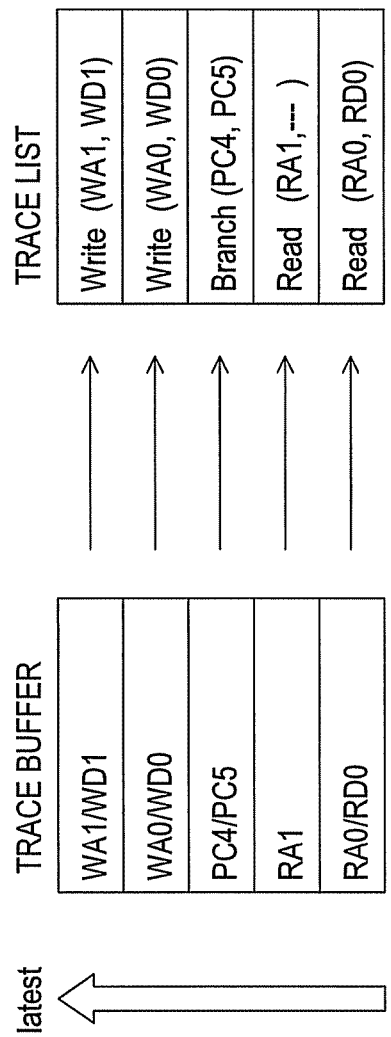
FIG. 4 illustrates a process of extracting a trace list to be proposed to a user from trace information recorded in a trace buffer.

FIG. 4 illustrates a process in which a trace list to be presented to a user is extracted from the trace information recorded in the trace buffer. The left side of FIG. 4 illustrates trace frames that are stored in the trace buffer, and that correspond to the example of execution histories illustrated in FIG. 3. The right side of FIG. 4 illustrates information in a trace list that is extracted from each trace frame. For example, from data of a trace frame of the write access WA1 and the write data WD1 that are stored in the trace buffer in the cycle t8, an instruction notation Write (WA1, WD1) that represents an instruction for writing the write data WD1 at the write address WA1 may be generated. Likewise, regarding each trace frame, one instruction notation may be generated from one trace frame. Note that a read instruction Read (RA1, - - - ) indicates that history information on read data has been lost.

In a method of storing branch trace information and data trace information as different frames into a trace buffer as mentioned above, a debugging circuit is configured to take into account the fact that trace information in one trace frame is produced over a plurality of cycles. As a result, the circuit configuration of the debugging circuit is large-scaled and complicated. A plurality of pieces of trace information to be recorded are sometimes produced at one time in one instruction execution cycle, and therefore a lost-data buffer is desirably prepared. However, when an instruction execution cycle in which a plurality of pieces of trace information are produced at one time is repeated continuously many times, a lost-data buffer having a number of stages at least equal to the number of times the cycle is repeated is desired. The number of times of repeating the cycle varies from one program to another. No matter how many stages there are in the lost-data buffer, it is nearly impossible to prevent data loss with reliability.

As described above, a system of recording trace information in a data format arranged for each branch execution and for each data access execution in a debugging circuit has several problems. Accordingly, when trace information is recorded for each instruction execution cycle in a debugging circuit, it is preferable that recording be performed without use of a data format arranged in such a way, and the trace information be converted to data in the arranged data format by a post-process after recording the trace information.

In the debugging system 10 illustrated in FIG. 1, the execution histories on executions of the CPU 21 when a program is executed by the CPU 21 in the semiconductor device 11 including the CPU 21 are traced. At this point, one or a plurality of tracing objects is traced via the debugger software 15 from the outside of the semiconductor device 11. First, for each instruction execution cycle in which information to be recorded is produced as an execution history or execution histories, the produced information to be recorded is recorded, as trace information on the execution of one or a plurality of tracing objects, in the trace buffer 16. For example, as in the cycle t5 of FIG. 3, trace information (PC5, WA0/WD0 and RD0) that is produced in the cycle t5 and that is related to the execution of a plurality of tracing objects (e.g., a branch instruction of PC4, a write instruction of PC5, and a read instruction of PC1) is recorded in the trace buffer 16. Under this condition, the produced information is merely recorded in the trace buffer 16 for each instruction execution cycle, and a data format arranged, for example, for each branch execution and for each data access execution is not yet used. Next, a data sort is performed using the debugger software 15 so that the trace information that is related to the execution of the one or the plurality of tracing objects and that is recorded for each instruction execution cycle is grouped for each of the one or the plurality of tracing objects. In other words, by sorting data of trace information that is obtained by merely recording the produced information in the trace buffer 16 for each instruction execution cycle, data in a data format arranged, for example, for each branch execution and for each data access execution is produced.

When the produced information is merely recorded in the trace buffer 16 for each instruction execution cycle as described above, trace information that is produced and recorded in one instruction execution cycle (hereinafter referred to as a "cycle frame") sometimes does not make up unified, complete trace information. For example, since a branch destination program counter value of branch trace information is found in a cycle next to a cycle in which a branch source program counter value of the branch trace information is found, the branch trace information is stored separately in two cycle frames, that is, a cycle frame in which the branch source counter value is stored and a cycle frame in which the branch destination counter value is stored. Regarding data trace information, if an address and data are not simultaneously found, the data trace information is divided into two pieces of information and the two pieces of information are stored. When the trace information is read from the trace buffer 16, data of the trace information is sorted by the debugger software 15. As a result, the trace information divided into different cycle frames is rearranged so that the cycle frames are unified. Note that information required for rearrangement of the trace information in the trace buffer 16 is stored in advance in each cycle frame.

FIG. 5 illustrates an example of a cycle frame format of the tracing method. In the cycle frame format example illustrated in FIG. 5, one cycle frame is in a 140-bit width in the case of a CPU in a 32-bit configuration. Bit 139 is provided for storing a flag indicating a branch source. Likewise, bit 138 is provided for storing a flag representing a branch destination, and bits 137 to 135 are provided for storing values representing branch factors. Executing program counter values are stored in bits 134 to 103. Bit 102 is provided for storing a flag indicating whether read data is valid or not. Likewise, bits 101 to 100 are provided for storing read data identifications (IDs), and bits 99 to 68 are provided for storing read data. Bit 67 is provided for storing a flag indicating whether a data access is valid or not. Bit 66 is provided for storing a value indicating that access is read or write. Bits 65 and 64 are provided for storing data access sizes, bits 63 to 32 are provided for storing access addresses, and further bits 31 to 0 are provided for storing write data.

Here, three bits (bits 137 to 135) are assigned to branch factors; however, the bit width depends on the number of kinds of branch factors. Two bits (bits 101 to 100) are assigned to a read data ID; however, the bit width depends on the number of the subsequent read accesses that the CPU may issue prior to read data that has not been received. In the case of a two-bit configuration, assuming that the ID of a read access is "00", three read accesses with IDs "01", "10" and "11" may be issued before read data corresponding to the read accesses is received. Read data that has been read by using the read access with the read access ID of "00" is recorded together with read data ID having the same value of "00". Bits 31 to 0 are used as a storage area of write data in this example. However, there is no write data at the time of read access, and therefore bits 1 to 0, part of the bits 31 to 0, are used also for storing the read access ID. Instead, a bit used exclusively to store a value representing the read access ID may be provided.

The cycle frame format illustrated in FIG. 5 is an example, and this technique is not limited to this configuration. In a tracing method by this technique, a cycle frame format may include all pieces of execution history information that is to be recorded and may be simultaneously producible in one instruction execution cycle, and information (read access IDs, read data IDs and the like) used for data sorting as the post-process.

FIG. 6 illustrates an example of a configuration of a debugging circuit. In FIG. 6, the same components as those in FIG. 1 are designated by the same numbers, and their descriptions are omitted. The debugging circuit 22 includes the trace buffer 16, a trace controlling unit 17, and a communication unit 18. The trace controlling unit 17 receives branch information, executing program counter values, data access attributes, data access addresses, read data, and write data from the CPU 21. Information stored in a cycle frame illustrated in FIG. 5 is included in the information received from the CPU 21. For example, information of read data validity, read data ID, data access validity, read/write, access sizes and read access IDs may be included in data access attributes received from the CPU 21. Likewise, information of a branch source flag, a branch destination flag, and branch factors may be included in branch information received from the CPU 21.

The trace controlling unit 17 includes a write controller 31, an acquisition trace information setting unit 32, and a write pointer controlling unit 33. A plurality of tracing objects are specified in the acquisition trace information setting unit 32. As a result, for each instruction execution cycle in which information that is about the tracing objects specified in the acquisition trace information setting unit 32 and that is to be recorded, the write controller 31 records trace information in the trace buffer 16. For example, if a branch event and a data access event are specified as tracing objects, cycle frames for instruction execution cycles in which information that is about a branch and a data access and that is to be recorded are produced are recorded in the trace buffer 16. For example, if data access information is specified as a tracing object, cycle frames for instruction execution cycles in which information that is about a data access and that is to be recorded is recorded in the trace buffer 16. In this case, recording in the trace buffer 16 is not performed for instruction execution cycles in which information that is about a branch not specified as the tracing object and that is to be recorded is produced. Thus, histories on the execution of the operation that produces information specified as tracing objects are recorded. This allows a storage space of the trace buffer 16 to be utilized effectively.

The write controller 31 asserts a write instruction signal when recording a cycle frame. The write instruction signal is supplied to the trace buffer 16 and is also supplied to the write pointer controller 33. The write pointer controller 33 increments a write pointer counter every time a write instruction signal is asserted. The value of the write pointer counter represents a write address. Upon assertion of a write instruction signal, the trace buffer 16 stores a cycle frame supplied from the write controller 31 at a write address supplied from the write pointer controller 33. The communication unit 18 reads content recorded in the trace buffer 16 in response to a request read from the host computer 13 that is supplied via the external debugging device 12, and transmits the content via the external debugging device 12 to the host computer 13.

FIG. 7 illustrates an example of the operation of the debugging circuit when trace information on execution histories of the CPU is recorded in the cycle frame format illustrated in FIG. 5. Reference characters t1 to t9 denote nine successive instruction execution cycles of the CPU 21. The row of "execution PC" illustrates a program counter value (a PC value of the CPU 21) in each cycle, and the row of "branch information" illustrates a branch source or a branch destination. The row of "data access" illustrates a read access or a write access. The row of "write data" illustrates write data corresponding to a write access, and a row of "read data" illustrates read data corresponding to a read access. A table "trace buffer" illustrates trace information listed from the bottom toward the top in the order in which the trace information is recorded. Here, underlined information in the table "trace buffer" represents information that is newly stored in the cycle in question. In the operation example illustrated in FIG. 7, load instructions are executed in the cycles t1 and t2, a branch instruction is executed in the cycle t4, and store instructions are executed in the cycles t5 and t6.

A read access RA0 and a read access RA1 are produced in the cycles t1 and t2, respectively, and trace information representing the read accesses is stored in the trace buffer. That is, a program counter value is set at bit 134 to 103 and a value "Ob0" is set at bit 66 in a data trace frame illustrated in FIG. 5, and the data trace frame is stored in the trace buffer 16. In addition, the bit representing data access validity and the bits representing read access IDs are set. Values corresponding to the read accesses are stored as access sizes and access addresses of the data trace frame. However, regarding access data, read data is not acquired at this point and therefore no value is set.

Regarding a branch instruction executed in the cycle t4, just branch source information is produced, and therefore the branch source information and an executing program counter value are stored in the trace buffer 16. That is, in the cycle frame illustrated in FIG. 5, a flag indicating a branch source at bit 139 is set, executing program counter values are set at bits 134 to 103, and the cycle frame is stored in the trace buffer 16.

In the cycle t5, information of a branch destination is obtained. Accordingly, in the cycle t5, a flag indicating the branch destination at bit 138 of the cycle frame illustrated in FIG. 5 is set, values representing branch factors are set at bits 137 to 135, executing program counter values are set at bits 134 to 103, and the cycle frame is stored in the trace buffer 16. In the example illustrated in FIG. 7, in the cycle t5, further, the write access WA0 and the write data WD0 are produced by an instruction execution of the program counter value PC5, and at the same time the read data RD0 corresponding to the read access RA0 of the program counter value PC1 is received. Accordingly, in the cycle frame stored in the trace buffer 16 in the cycle t5, trace information on the data accesses is appropriately set together with the branch destination information.

In the cycle t6, the write access WA1 and the write data WD1 are produced by an instruction execution of the program counter value PC6, and at the same time the read data RD1 corresponding to the read access RA1 of the program counter value PC2 is received. Accordingly, trace information representing the write access and trace information on the read data is stored as one cycle frame into the trace buffer 16. That is, in the cycle frame illustrated in FIG. 5, executing program counter values are stored at bits 134 to 103, a value "Ob1" is stored at bit 66, and data representing data access validity is stored at bit 67. Values corresponding to the write access are stored as access sizes, access addresses, and write data. Values corresponding to the received read data are stored as a read data ID and read data. Likewise, in the subsequent processes, information on the execution of the CPU is stored in the trace buffer in the order in which the information is produced.

FIG. 8 is a flowchart illustrating an example of a process of building branch trace information. The processing of the flowchart is performed for trace information in the cycle frame format recorded in the trace buffer 16, by the debugger software 15 of the host computer 13.

In step S1, the newest cycle frame is set as a target cycle frame. In step S2, it is determined whether a branch destination flag of the target cycle frame is set to H (a value representing a branch destination). If the result is NO, then the process proceeds to the next cycle frame and the next cycle frame is set as the target cycle frame. This processing is repeated until a cycle frame in which the branch destination flag is set is detected. If the cycle frame with the branch destination flag is detected (YES in S2), then information of the branch factor and the branch destination program counter value is extracted from the target cycle frame in step S3. In step S4, the process proceeds to the next cycle frame and the next cycle frame is set as the target cycle frame. In step S5, it is confirmed that a branch source flag is on, and the branch source program counter value is extracted from the cycle frame. In step S6, using the branch factor and the branch destination program counter value acquired in step S3 and the branch source program counter value acquired in step S5, one piece of branch trace information is built. In step S7, it is further determined whether a branch destination flag is also on in the target cycle frame. If the result is YES, the process returns to step S3 and the subsequent processing is repeated. This corresponds to the case where the targeted execution instruction involves an instruction for a branch destination and an instruction for a branch source. If the branch destination flag is not on (NO in S7), then it is determined in step S8 whether the target cycle frame is the final cycle frame. If the target cycle frame is not the final cycle frame, the process proceeds to the next cycle frame and the next cycle frame is set as the target cycle frame in step S9 and returns to step S2, and the subsequent processing is repeated. In the case of the final cycle frame (YES in S8), the branch trace information building process ends.

Figure 9:
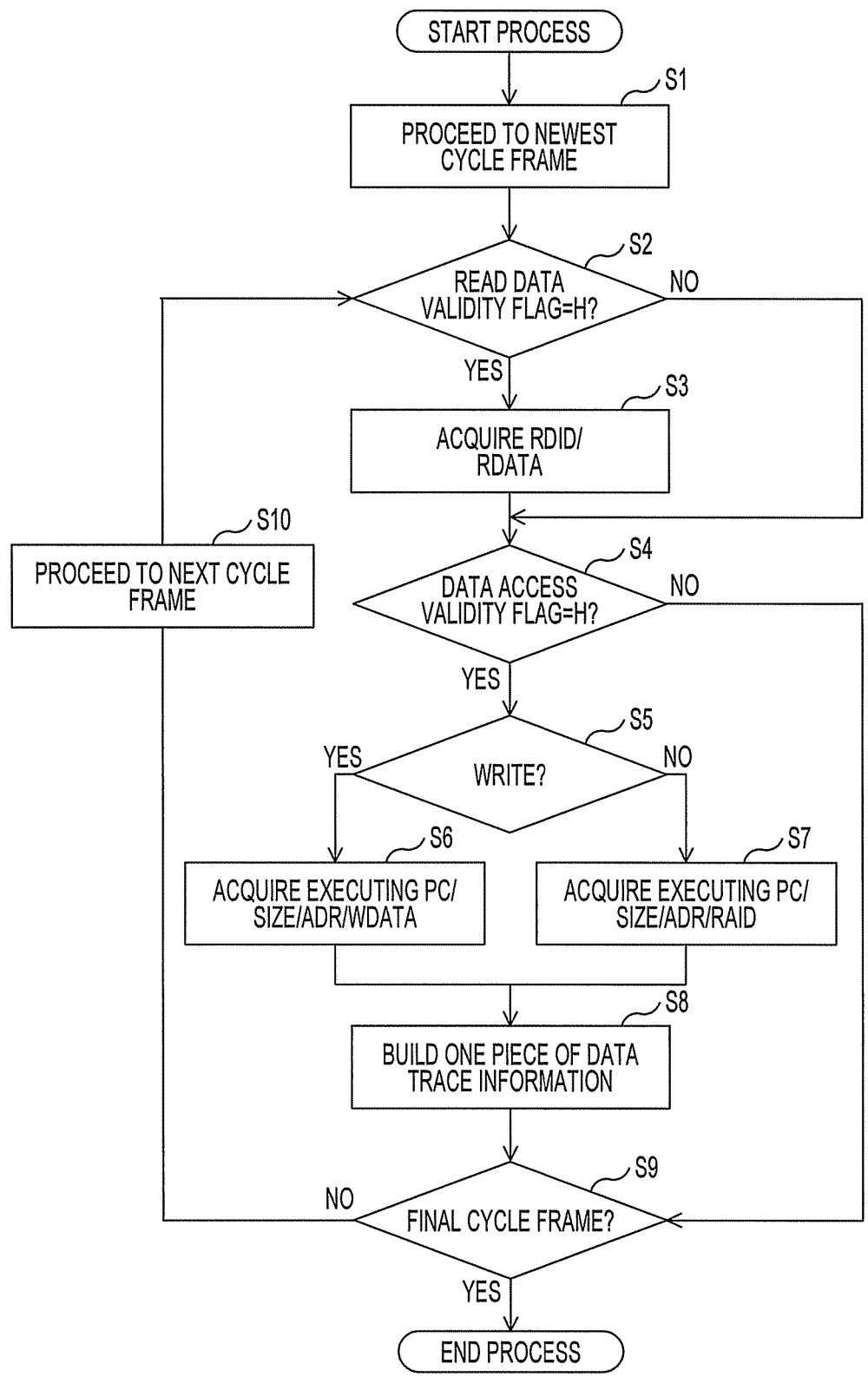
FIG. 9 is a flowchart illustrating an example of a process of building data trace information.

FIG. 9 is a flowchart illustrating an example of a process of building data trace information. The processing of the flowchart is performed for trace information in the cycle frame format recorded in the trace buffer 16, by the debugger software 15 of the host computer 13.

In step S1, the newest cycle frame is set as a target cycle frame. In step S2, it is determined whether a read data validity flag of the target cycle frame is set to H (a value representing validity). If the read data validity flag is not set (NO in S2), the process proceeds to step S4. Alternatively, if the read data validity flag is set (YES in S2), read data ID (RDID) and read data (RDATA) are extracted from the target cycle frame in step S3. In step S4, it is determined whether a data access validity flag is on in the target frame. If the data access validity flag is not on (NO in S4), the process proceeds to step S9. If the data access validity flag is on (YES is S4), it is determined in step S5 whether the data access is a write data access.

If the data access is a write data access (YES in S5), an executing program counter value, an access size (SIZE), and an access address (ADR), and write data (WDATA) are acquired from the target cycle frame in step S6. In the subsequent step S8, one piece of write data trace information is built using the executing program counter value, the access size, the access address, and the write data acquired in step S6.

Alternatively, if the data access is not a write data access (NO in 55), an executing program counter value, an access size (SIZE), and an access address (ADR), and a read access ID (RAID) are acquired from the target cycle frame in step S7. In the subsequent step S8, one piece of read data trace information is built using the executing program counter value, the access size and the access address, and the read data acquired in step S3 that corresponds to the read access ID acquired in step S7.

In step S9, it is determined whether the target cycle frame is the final cycle frame. If the target cycle frame is not the final cycle frame, the process proceeds to the next cycle frame in step S10 (the next cycle frame is set as the target cycle frame), and the process returns to step S2 and repeats the subsequent processing. If the target frame is the final cycle frame (YES in S9), the process of building data trace information ends.

In the above process, the determination in step S5 may be performed based on a data access validity flag and a flag indicating a read access or a write access. Note that read data trace information sometimes extends over two cycle frames, and read data and read access information are sometimes stored in one cycle frame. Regarding write data trace information, all information is stored in one cycle frame. Note that, if the above process is set so that just read data trace information is acquired, there is no trace information related to write data, whereas if the above process is set so that just write data trace information is acquired, there is no trace information related to read data.

Figure 10:
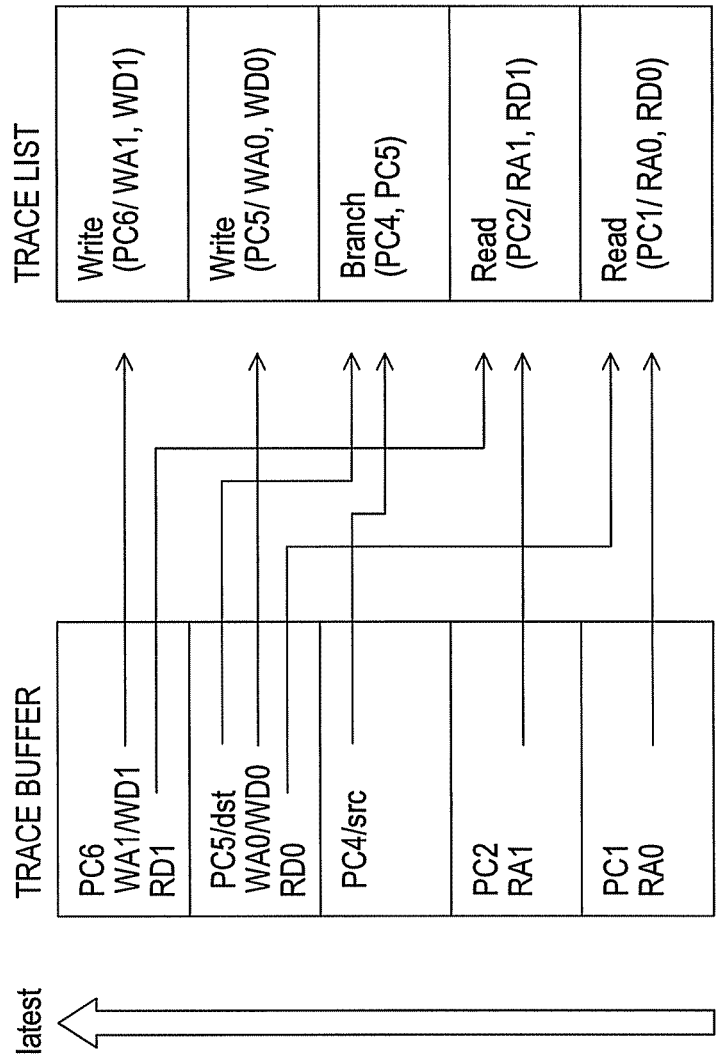
FIG. 10 illustrates a process of extracting a trace list to be proposed to a user from trace information recorded in the trace buffer.

FIG. 10 illustrates a process in which a trace list to be proposed to a user is extracted from trace information recorded in the trace buffer. The left side of FIG. 10 illustrates cycle frames that are to be stored in the trace buffer, and that correspond to the example of execution histories illustrated in FIG. 7. The right side of FIG. 10 illustrates information in a trace list extracted from cycle frames. For example, based on part of information of a cycle frame stored in the trace buffer in the cycle t6, an instruction notation Write (PC6/WA1, WD1) that represents an instruction for writing the write data WD1 at the write address WA1 with the program counter value PC6 is generated. Based on the remaining part of the information of the cycle frame stored in the trace buffer in the cycle t6 and information of a cycle frame stored in the trace buffer in the cycle t2, an instruction notation Read (PC2/RA1, RD1) that represents a read instruction with the program counter value PC2 is generated. In the same way, an instruction notation in a trace list is generated by sorting data recorded in cycle frames. In other words, data recorded separately in a plurality of cycle frames is collected into one group, thereby generating one instruction notation in a trace list.

Based on the foregoing technique, trace information produced in each instruction execution cycle is stored intact for each instruction execution cycle. A complicated frame formation process by the debugging circuit 22 is therefore not necessary. The trace buffer 16 has a bit width capable of storing all information that may be produced in one cycle. No execution history information is therefore lost. Moreover, information on execution histories of the CPU is stored together with executing program counter values into the trace buffer 16 for each instruction execution cycle. Values of executing program counters are therefore obtained for all trace information. Since trace information recorded in the trace buffer 16 includes ID information for grouping data for each execution of an instruction, and the like, trace information in a data format in which traced objects are grouped for each execution of an instruction is produced later by the debugger software 15.

Figure 11:
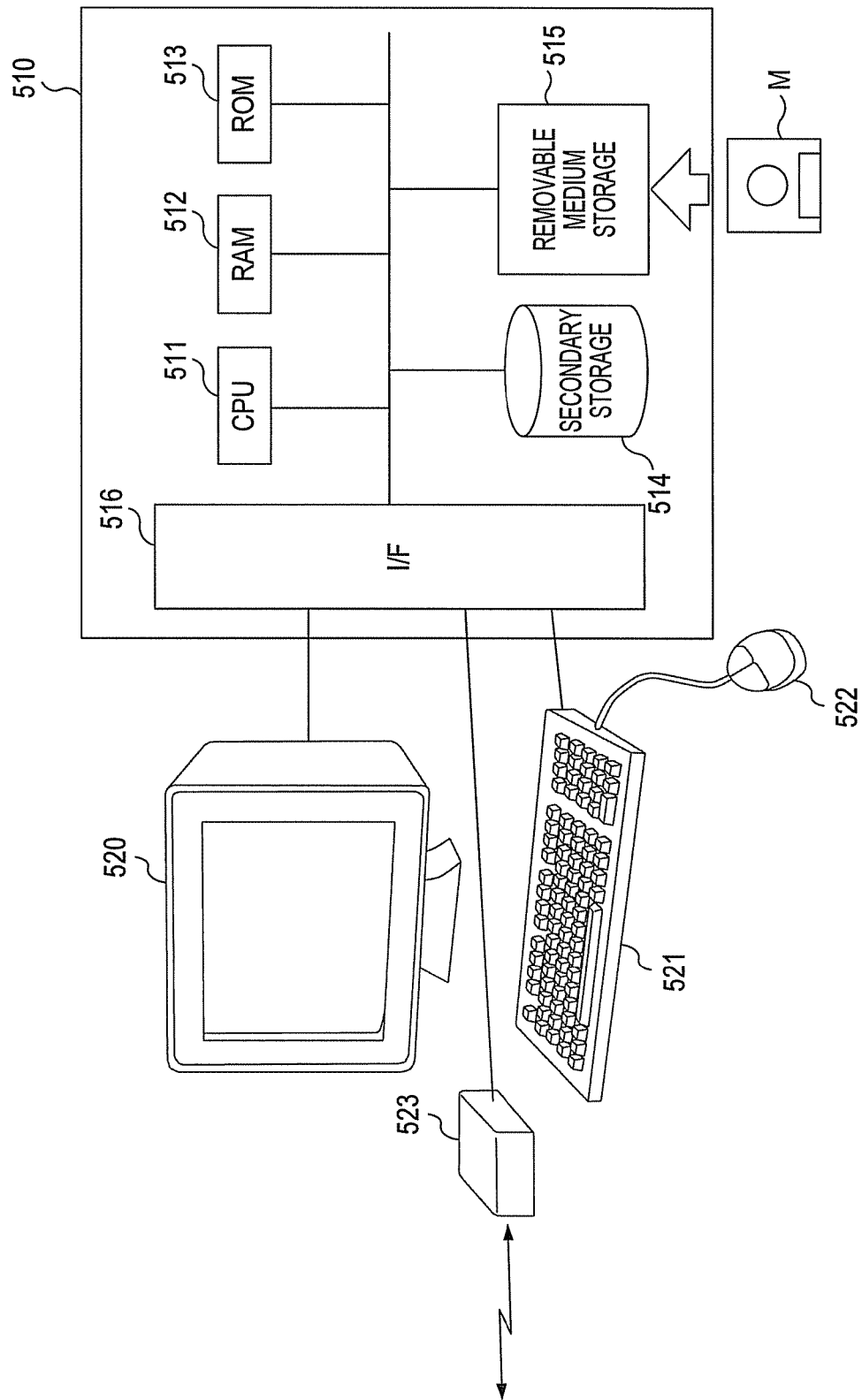
FIG. 11 illustrates a configuration of a device that performs a data sort by software.

FIG. 11 illustrates a configuration of a device that performs data sorting by software. As illustrated in FIG. 11, the device that performs data sorting by software is implemented by a computer, such as a personal computer or an engineering workstation. The device of FIG. 11 includes a computer 510, and a display device 520, a communication device 523, and an input device connected to the computer 510. The input device includes, for example, a keyboard 521 and a mouse 522. The computer 510 includes a CPU 511, a RAM 512, a ROM 513, a secondary storage 514 such as a hard disk, a removable medium storage 515, and an interface 516. The computer 510 corresponds to the host computer 13 of FIG. 1.

The keyboard 521 and the mouse 522 provide interfaces with a user. Various kinds of commands for operating the computer 510 and user responses for requested data are input with the keyboard 521 and the mouse 522. The display device 520 displays results of processing by the computer 510, and the like, and performs various data display for enabling communication with a user at the time of operating the computer 510. The communication device 523 is a device for communication with a remote location, and is made of, for example, a modem or a network interface.

Data sorting by software according to the invention is provided as computer programs that are executable by the computer 510. The computer programs may be stored in a storage medium M that is attachable to the removable medium storage 515, and are loaded from the storage medium M through the removable medium storage 515 to the RAM 512 or the secondary storage 514. Alternatively, the computer programs may be stored in a storage medium (not shown) at a remote location, and loaded from the storage medium through the communication device 523 and the interface 516 to the RAM 512 or the secondary storage 514.

When a program execution instruction is given from a user via the keyboard 521 and/or the mouse 522, the CPU 511 loads the program from the storage medium M, the remote storage medium, or the secondary storage 514 to the RAM 512. The CPU 511 executes the program loaded in the RAM 512 using a free storage space of the RAM 512 as a work area, and performs processing while communicating with a user. Note that, in the ROM 513, a control program for controlling the basic operation of the computer 510 is stored.

By performing the foregoing computer program, the computer 510 performs a data sort by software as described in the foregoing embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An execution history tracing method of tracing an execution history of a CPU upon executing, in a semiconductor device including the CPU, a program by using the CPU, for a tracing target, from outside the semiconductor device via software, the execution history tracing method comprising:

recording, in a buffer, target information as trace information about an execution of one or more tracing target, for each instruction execution cycle in which the target information is produced as the execution history; and performing data sorting by using the software to group the trace information about the execution of the one or more tracing target, the trace information being recorded for the each instruction execution cycle, for each of the one or more tracing target, wherein in the recording, the trace information is recorded in the buffer having a bit width that allows for storing all the target information that is produced in the each instruction execution cycle using a trace frame format having a fixed bit width for the each instruction and is larger than a bit width of the CPU.

2. The execution history tracing method according to claim 1, wherein a debugging circuit included in the semiconductor device records the trace information in the buffer, and the software executed on a computer coupled to the semiconductor device performs the data sorting.

3. The execution history tracing method according to claim 1, wherein the one or more tracing target includes branch information representing a history of an instruction execution, and data access information representing a history of a data access execution, and the trace information recorded for the each instruction execution cycle in the buffer includes a bit for storing data representing a branch source, a bit for storing data representing a branch destination, a bit for storing data representing a branch factor, a bit representing an executing program counter value, a bit for storing data representing validity of a read data value, a bit for storing a read data ID, a bit for storing a read data value, a bit for storing data representing validity of a data access, a bit for storing data representing a read or write access, a bit for storing data representing an access size, a bit for storing an access address, a bit for storing write data, and a bit for storing a read access ID.

4. The execution history tracing method according to claim 1, further comprising: specifying the one or more tracing target, and wherein, in the recording, the trace information is recorded in the buffer for the each instruction execution cycle in which the target information is produced.

5. An execution history tracing method for a semiconductor device including a CPU, the method comprising:

executing a program by using the CPU; and tracing, from outside the semiconductor device via software, one or more tracing target included in an execution history upon executing the program, wherein for each instruction execution cycle in which target information is produced as the execution history, the target information is recorded as trace information about an execution of the one or more tracing target, in a buffer, and data sorting of the trace information is performed by the software so that data of the trace information is grouped for each of the one or more tracing target, wherein in the recording, the trace information is recorded in the buffer using a bit width that allows for storing all the target information that is produced in the each instruction execution cycle using a trace frame format having a fixed bit width for the each instruction and is larger than a bit width of the CPU.

* * * * *